US009249790B2

(12) United States Patent
Kobryn et al.

(10) Patent No.: US 9,249,790 B2
(45) Date of Patent: Feb. 2, 2016

(54) APPARATUS AND METHODS FOR CONSERVING ENERGY IN FUELING APPLICATIONS

(75) Inventors: Alexander P. Kobryn, Cottage Grove, WI (US); Donald Edward Watzke, Jr., McFarland, WI (US); William S. Nelson, Sun Prairie, WI (US)

(73) Assignee: Franklin Fueling Systems, Inc., Madison, WI (US)

( * ) Notice: Subject to any disclaimer, the term of this patent is extended or adjusted under 35 U.S.C. 154(b) by 1219 days.

(21) Appl. No.: 13/164,402

(22) Filed: Jun. 20, 2011

(65) Prior Publication Data

US 2011/0308624 A1 Dec. 22, 2011

Related U.S. Application Data

(60) Provisional application No. 61/357,452, filed on Jun. 22, 2010.

(51) Int. Cl.
*G01F 23/00* (2006.01)
*F04B 23/02* (2006.01)
*F04B 23/00* (2006.01)
*F04B 49/02* (2006.01)
*F17D 3/00* (2006.01)

(52) U.S. Cl.
CPC .............. *F04B 23/021* (2013.01); *F04B 23/00* (2013.01); *F04B 49/02* (2013.01); *F17D 3/00* (2013.01); *F04B 2205/01* (2013.01); *G01F 23/0069* (2013.01); *G01F 23/0076* (2013.01); *Y10T 137/0318* (2015.04); *Y10T 137/7287* (2015.04); *Y10T 137/86131* (2015.04)

(58) Field of Classification Search
CPC ..... F04D 13/12; F04D 13/14; G01F 23/0069; G01F 23/0076
USPC ................. 417/2–5, 7, 286; 702/55
See application file for complete search history.

(56) References Cited

U.S. PATENT DOCUMENTS

| | | | |
|---|---|---|---|
| 2,797,846 A * | 7/1957 | Reed | 222/63 |
| 4,247,899 A | 1/1981 | Schiller et al. | |
| 4,550,859 A | 11/1985 | Dow, Jr. et al. | |
| 4,795,314 A | 1/1989 | Prybella et al. | |
| 4,945,491 A | 7/1990 | Rishel | |
| 5,269,353 A | 12/1993 | Nanaji et al. | |
| 5,332,011 A | 7/1994 | Spalding | |
| 5,355,915 A | 10/1994 | Payne | |
| 5,505,180 A | 4/1996 | Otterman et al. | |
| 5,609,140 A | 3/1997 | Kramer et al. | |
| 5,769,134 A | 6/1998 | Kenney et al. | |
| 6,070,760 A | 6/2000 | Kenney et al. | |
| 6,178,393 B1 | 1/2001 | Irvin | |
| 6,190,565 B1 | 2/2001 | Bailey et al. | |
| 6,314,947 B1 | 11/2001 | Roche | |

(Continued)

OTHER PUBLICATIONS

International Search Report dated Nov. 14, 2011 in corresponding International Application No. PCT/US2011/041079.

(Continued)

*Primary Examiner* — Peter J Bertheaud
(74) *Attorney, Agent, or Firm* — Faegre Baker Daniels LLP

(57) ABSTRACT

A fuel delivery system is provided including one or more pump assemblies and one or more controllers configured to control the one or more pump assemblies. The fuel delivery system may conserve energy by selectively activating the one or more pump assemblies and the one or more controllers.

18 Claims, 8 Drawing Sheets

(56) References Cited

U.S. PATENT DOCUMENTS

| | | |
|---|---|---|
| 6,352,176 B1 | 3/2002 | Hartsell, Jr. et al. |
| 6,481,973 B1 | 11/2002 | Struthers |
| 6,625,519 B2 | 9/2003 | Goodwin et al. |
| 6,850,849 B1 | 2/2005 | Roys |
| 6,874,503 B2 | 4/2005 | Rydgren |
| 6,931,305 B2 | 8/2005 | Sherwood |
| 7,114,490 B2 | 10/2006 | Zdroik |
| 7,260,499 B2 * | 8/2007 | Watzke et al. ............ 702/183 |
| 2002/0136642 A1 | 9/2002 | Moller |
| 2007/0166169 A1 | 7/2007 | Venkatachari et al. |
| 2009/0294470 A1 | 12/2009 | Lampe |

OTHER PUBLICATIONS

International Preliminary Report on Patentability dated Dec. 28, 2012 in corresponding PCT Application No. PCT/US2011/041079.

* cited by examiner

APPARATUS AND METHODS FOR CONSERVING ENERGY IN FUELING APPLICATIONS

RELATED APPLICATIONS

This application claims the benefit of U.S. Provisional Patent Application No. 61/357,452, the disclosure of which is expressly incorporated by reference herein.

FIELD

The present disclosure relates to fuel delivery systems. More particularly, the present disclosure relates to an apparatus, systems, and methods for conserving energy in fueling applications.

BACKGROUND AND SUMMARY

In a fuel delivery system, a submersible turbine pump (STP) assembly pumps fuel from a storage tank to a dispenser for vehicle fueling. For large capacity systems, multiple pumps are used to provide sufficient flow rates when many fueling points are simultaneously active. For example, two or more STP's are connected through a manifold to supply adequate flow and pressure to multiple vehicles simultaneously. In these large capacity systems, multiple controllers are sometimes used to control the multiple pumps.

In an exemplary embodiment of the present disclosure, a fuel delivery system is provided for delivering fuel from a fuel source to at least one dispenser through a piping system. The fuel delivery system includes a first pump coupled to the piping system to provide fuel from the fuel source to the at least one dispenser. The fuel delivery system includes a second pump coupled to the piping system to provide fuel from the fuel source to the at least one dispenser. The fuel delivery system further includes a primary controller configured to control operation of the first pump. The primary controller monitors a fuel demand level for fuel delivered to the at least one dispenser. The fuel delivery system further includes a secondary controller configured to control operation of the second pump. The secondary controller is activated when the fuel demand level exceeds a first threshold level. The secondary controller is deactivated when the fuel demand level decreases below a second threshold level.

In another exemplary embodiment of the present disclosure, a method of conserving energy in a fuel delivery system which delivers fuel from a fuel source to at least one dispenser through a piping system is provided. The method includes the steps of providing a first pump coupled to the piping system to provide fuel from the fuel source to the at least one dispenser, providing a second pump coupled to the piping system to provide fuel from the fuel source to the at least one dispenser, and controlling the first pump with a primary controller to deliver fuel to the at least one fuel dispenser. The method further includes the steps of monitoring a fuel demand level for fuel delivered to the at least one dispenser and activating a secondary controller to control operation of the second pump when the fuel demand level exceeds a first threshold level. The method further includes the step of deactivating a secondary controller when the fuel demand level decreases below a second threshold level.

In yet another exemplary embodiment of the present disclosure, a fuel delivery system is provided for delivering fuel from a fuel source to at least one dispenser through a piping system. Each dispenser includes a switch to actuate the dispenser. The fuel delivery system comprises a variable speed pump coupled to the piping system to provide fuel from the fuel source to the at least one dispenser. The fuel delivery system comprises a fluid flow detector configured to detect fluid flow from the variable speed pump to the at least one dispenser through the piping system. The fuel delivery system further comprises a controller in communication with the variable speed pump and configured to control operation of the variable speed pump. The controller is configured to activate the variable speed pump at an initial pump speed upon receipt of an actuation signal from a switch of at least one dispenser. The controller is configured to increase the speed of the variable speed pump in response to a signal from the fluid flow detector upon detection of fluid flow.

In still another exemplary embodiment of the present disclosure, a method of conserving energy in a fuel delivery system which delivers fuel from a fuel source to at least one dispenser through a piping system is provided. Each dispenser includes a switch to actuate the dispenser. The method comprises the steps of providing a variable speed pump coupled to the piping system to provide fuel from the fuel source to the at least one dispenser, providing a controller in communication with the variable speed pump and configured to control operation of the variable speed pump, and receiving an actuation signal from a switch of the at least one fuel dispenser with the controller. The method further comprises operating the variable speed pump with the controller at a first speed in response to the actuation signal from the switch and detecting when fluid flow begins between the variable speed pump and the at least one fuel dispenser through the piping system. The method further comprises operating the variable speed pump at a second speed greater than the first speed upon detecting fluid flow in the detecting step.

In another exemplary embodiment of the present disclosure, a fuel delivery system is provided for delivering fuel from a fuel source to at least one dispenser through a piping system. The fuel delivery system comprises a pump to provide fuel from the fuel source to the at least one dispenser. The fuel delivery system further comprises a manifold coupled to the piping system and the pump. The manifold includes a fluid path to permit fuel to flow from the pump through the piping system to the at least one dispenser. The manifold also includes an air collection chamber located above the fluid path to collect air from the fluid path. The fuel delivery system further includes a bypass in fluid communication with the collection chamber of the manifold. The bypass is configured to open upon activation of the pump to remove air from the collection chamber.

BRIEF DESCRIPTION OF THE DRAWINGS

The above-mentioned and other features of the invention, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

Figure 1:
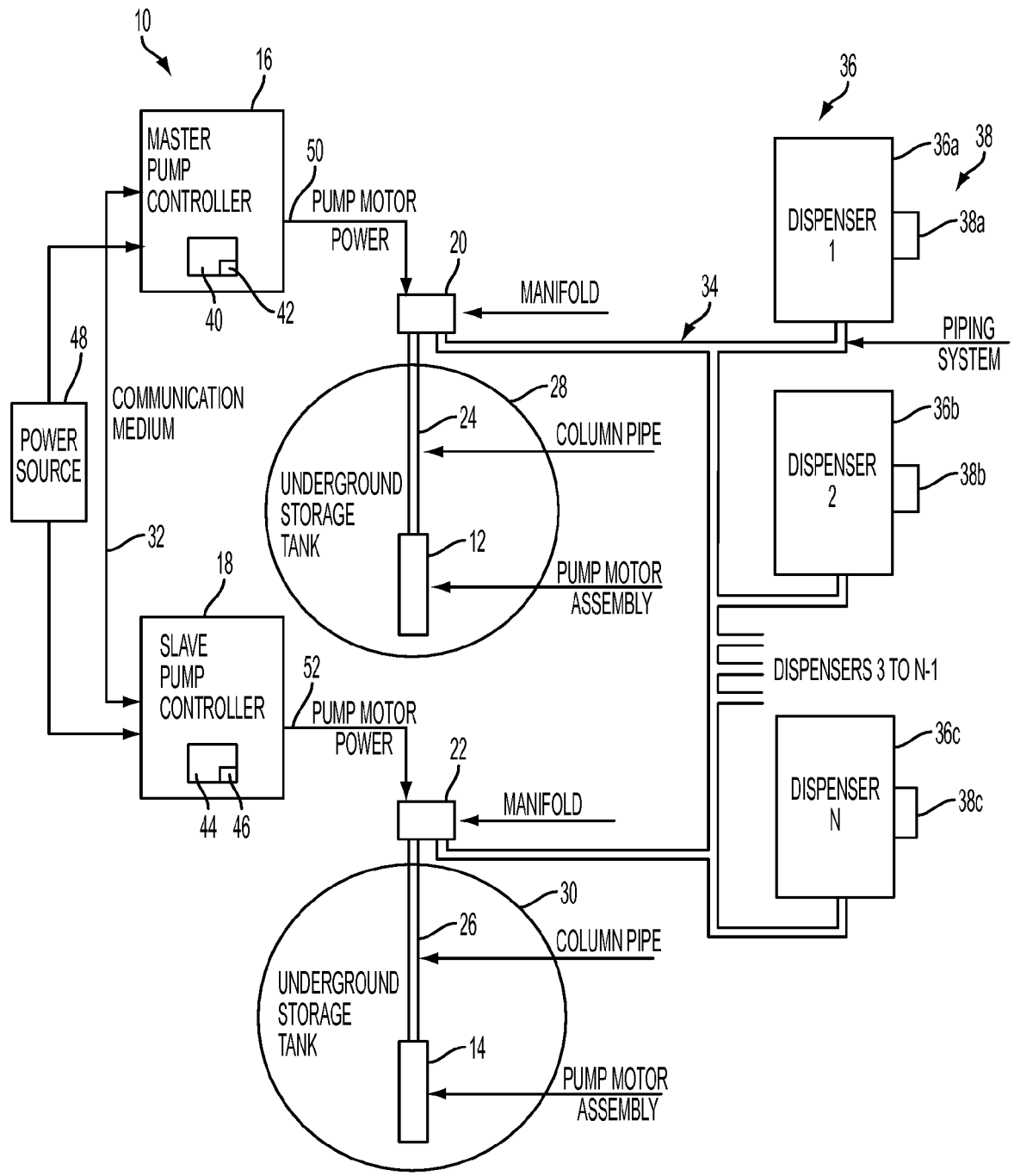
FIG. 1 is a block diagram illustrating an exemplary fuel delivery system including a primary pump controller and a secondary pump controller.

For the purposes of promoting an understanding of the principles of the present disclosure, reference will now be made to the embodiments described herein and illustrated in the drawings. The embodiments disclosed below are not intended to be exhaustive or limit the present system to the precise form disclosed in the following detailed description. Rather, the embodiments are chosen and described so that others skilled in the art may utilize their teachings. The present disclosure includes any alterations and further modifications of the illustrated devices, systems and described methods and further applications of the principles of the present disclosure which would normally occur to one skilled in the art.

Referring to FIG. 1, an exemplary fuel delivery system 10 is illustrated including a first pump assembly 12 and a second pump assembly 14. In the illustrated embodiment, pump assemblies 12, 14 are submersible turbine pump (STP) assemblies each including a motor controlled by pump controllers 16, 18, respectively. Pump assemblies 12, 14 are configured to pump a liquid product, illustratively fuel, from respective storage tanks 28, 30 to one or more fuel dispensers 36 through piping system 34. While two storage tanks 28, 30 and three fuel dispensers 36a, 36b, 36c are illustrated in FIG. 1, fuel delivery system 10 may include fewer or additional storage tanks and fuel dispensers. Fuel delivery system 10 may also include additional pumps and/or pump controllers. In one embodiment, multiple pumps 12, 14 are provided in a single storage tank 28 or 30.

Pumps 12, 14 are connected to piping system 34 through manifolds 20, 22, respectively. A column pipe 24 routes fuel from pump 12 to manifold 20, and a column pipe 26 routes fuel from pump 14 to manifold 22. In another embodiment, pumps 12, 14 are alternatively connected to piping system 34 through a single, common manifold. Piping system 34 routes fuel from pumps 12, 14 to fuel dispensers 36. Fuel dispensers 36 each include a nozzle 38 configured to deliver the fuel provided with pumps 12, 14 into a vehicle fuel tank or other fuel container. In one embodiment, the actuation of a trigger, such as a handle or lever, on nozzle 38 signals to controller 16 and/or controller 18 a demand for fuel from storage tank 28, 30 and causes the flow of fuel through dispenser 36 and through an outlet of the respective nozzle 38. The combination of pump 12, pipe 24, manifold 20, piping 34, and a dispenser 36 form a flow path for fluid flowing from storage tank 28 to an outlet of a nozzle 38. Similarly, the combination of pump 14, pipe 26, manifold 22, piping 34, and a dispenser 36 forms a flow path for fluid flowing from storage tank 30 to an outlet of a nozzle 38.

Controllers 16, 18 and pumps 12, 14 are configured to provide sufficient flow rates when many fueling points (i.e. fuel dispensers 36) are simultaneously active. In the illustrated embodiment, pump controller 16 is a master or primary controller 16 that provides power 50 from power source 48 to pump 12, and pump controller 18 is a slave or secondary controller 18 that provides power 52 from power source 48 to pump 14. Additional secondary controllers 18 may be provided to control additional secondary pumps 14. Primary controller 16 includes a processor 40 for controlling pump 12 and a memory 42 accessible by processor 40. Secondary controller 18 includes a processor 44 for controlling pump 14 and a memory 46 accessible by processor 44. Primary controller 16 is in communication with secondary controller 18 via communication medium 32. In addition, dispensers 36 are in communication with at least one of controllers 16, 18. In one embodiment, dispensers 36 each provide a demand signal or "hook" signal to one or more controllers 16, 18 demanding fuel, and the one or more controllers 16, 18 activate pumps 12, 14 upon receipt of the demand signal. As described herein, upon a first fuel dispenser 36 demanding fuel, primary controller 16 activates primary pump 12 while secondary pump 14 remains powered off. In one embodiment, the actuation of a trigger or switch on nozzle 38 or on dispenser 36 signals to controller 16 to activate pump 12. See, for example, switch 170 illustrated in FIG. 5 and described herein. Pump assembly 14 is activated as a secondary pump 14 upon primary pump 12 requiring pumping assistance to meet flow requirements, such as when multiple dispensers 36 are active (i.e., when multiple nozzles 38 are delivering fuel).

With only a single dispenser 36a active, the demanded flow rate is at a first level. When two dispensers 36a and 36b are active, the total demanded flow rate increases to a second level. The demanded flow rate continues to increase as additional fuel dispensers 36 become simultaneously active. In the illustrated embodiment, primary pump 12 is configured to provide the demanded flow rate until the demanded flow rate exceeds the capability or power threshold of primary pump 12.

For example, when a single vehicle enters a gas station and fueling commences at a fuel dispenser 36, primary pump 12 is configured to provide a sufficient flow rate to the dispenser 36 to fuel the vehicle in a timely manner. As more vehicles are fueled simultaneously with fuel delivery system 10, however, the flow demand on pump 12 increases and eventually reaches a point where pump 12 is unable to provide the desired flow rates to the multiple fueling points. In the illustrated embodiment, by monitoring the power 50 supplied to pump 12, primary controller 16 determines when an additional pump (e.g. secondary pump 14) should be turned on to maintain adequate flow rates as demanded by dispensers 36. If flow demand requires that one or more additional pumps 14 be turned on based on the monitored power 50, primary controller 16 instructs each secondary controller 18 to turn on its associated pump(s) 14.

In one illustrated embodiment, energy usage by fuel delivery system 10 is reduced by turning off one or more secondary pumps 14 when the monitored power 50 supplied to pump 12 indicates that the one or more secondary pumps 14 are no longer needed to meet the flow demand. The apparatus and method of the present disclosure senses the flow demand decrease and turns off the one or more secondary pumps 14 when flow demand permits. In the illustrated embodiment, based on the monitored power 50 provided by primary controller 16 to pump 12, controller 16 determines when the demanded flow rate has dropped to a suitable level such that secondary pumps 14 may be deactivated without compromising the flow rate. In one embodiment, secondary controllers 18 are also powered down when secondary pumps 14 are not active, as described herein.

Figure 3:
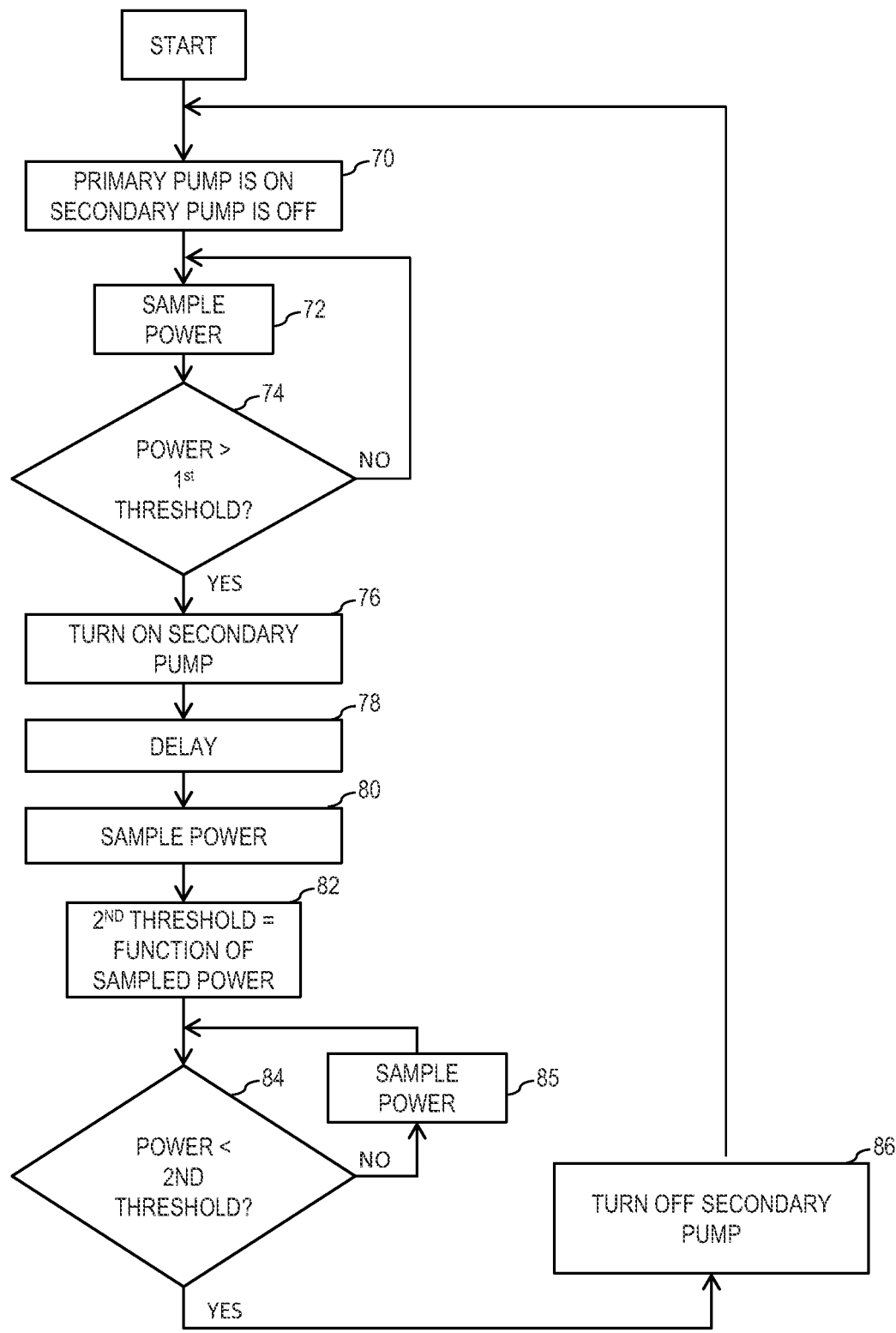
FIG. 3 is a flowchart illustrating an exemplary operation of the fuel delivery system of FIG. 1.

An exemplary operation of fuel delivery system 10 is illustrated in FIG. 3. The operation of FIG. 3 is described herein with reference to fuel delivery system 10 of FIG. 1. At block 70, primary controller 16 turns on pump 12 when a single dispenser 36 is initiated for fueling, while pump 14 remains turned off. In one embodiment, pump 12 is turned on when a switch at dispenser 36 is actuated, as described herein with reference to switch 170 of FIG. 5. The switch sends a signal to controller 16 upon actuation to instruct controller 16 to turn on pump 12. At block 72, primary controller 16 samples the power 50 drawn by pump 12. As additional vehicles start fueling at multiple dispensers 36, the power 50 supplied to pump 12 as measured by primary controller 16 increases due to increased flow demand. Controller 16 determines whether the power 50 supplied to pump 12 exceeds a first threshold level at block 74. If not, controller 16 continues to monitor the power 50 at block 72. If the power 50 supplied to pump 12 exceeds the first threshold at block 74, primary controller 16 communicates to secondary controller 18 to turn on its associated secondary pump 14 to assist with meeting flow demand, as illustrated at block 76. In one embodiment, primary controller 16 first sends a signal to activate secondary controller 18 before instructing secondary controller 18 to turn on pump 14. Primary controller 16 then delays a few seconds while secondary pump 14 is activated, as represented by block 78. After secondary controller 18 turns on its associated pump 14, the power 50 supplied to primary pump 12 decreases as multiple pumps 12, 14 work to meet the flow requirements. Additional secondary pumps 14 may be activated according to blocks 70-76, if necessary to meet flow demand.

Following the time delay, primary controller 16 again samples the primary pump input power 50, as illustrated at block 80, and uses the sampled power to determine a second threshold power value at which secondary pump 14 should be turned back off, as illustrated at block 82. Alternatively, controller 16 may access and implement a predetermined second threshold power value stored in memory 42. In one embodiment, the second threshold power value is less than the first threshold power value at which secondary pump 14 was activated. In the illustrated embodiment, the second threshold power value is less than the sampled power obtained at block 80. As vehicles stop fueling and fewer fuel dispensers 36 are used, the power consumption of pumps 12, 14 decreases. Controller 16 determines whether the power 50 supplied to primary pump 12 has dropped below the determined second threshold power value, as illustrated at block 84. If not, controller 16 continues to monitor the power 50 supplied to primary pump 12 at block 85. If the power 50 is less than the second threshold at block 84, primary controller 16 sends a signal to secondary controller 18 to turn off the associated secondary pump 14, as represented at block 86. The process of blocks 70 through 86 is repeated as additional fuel dispensers 36 again dispense fuel.

Figure 4:
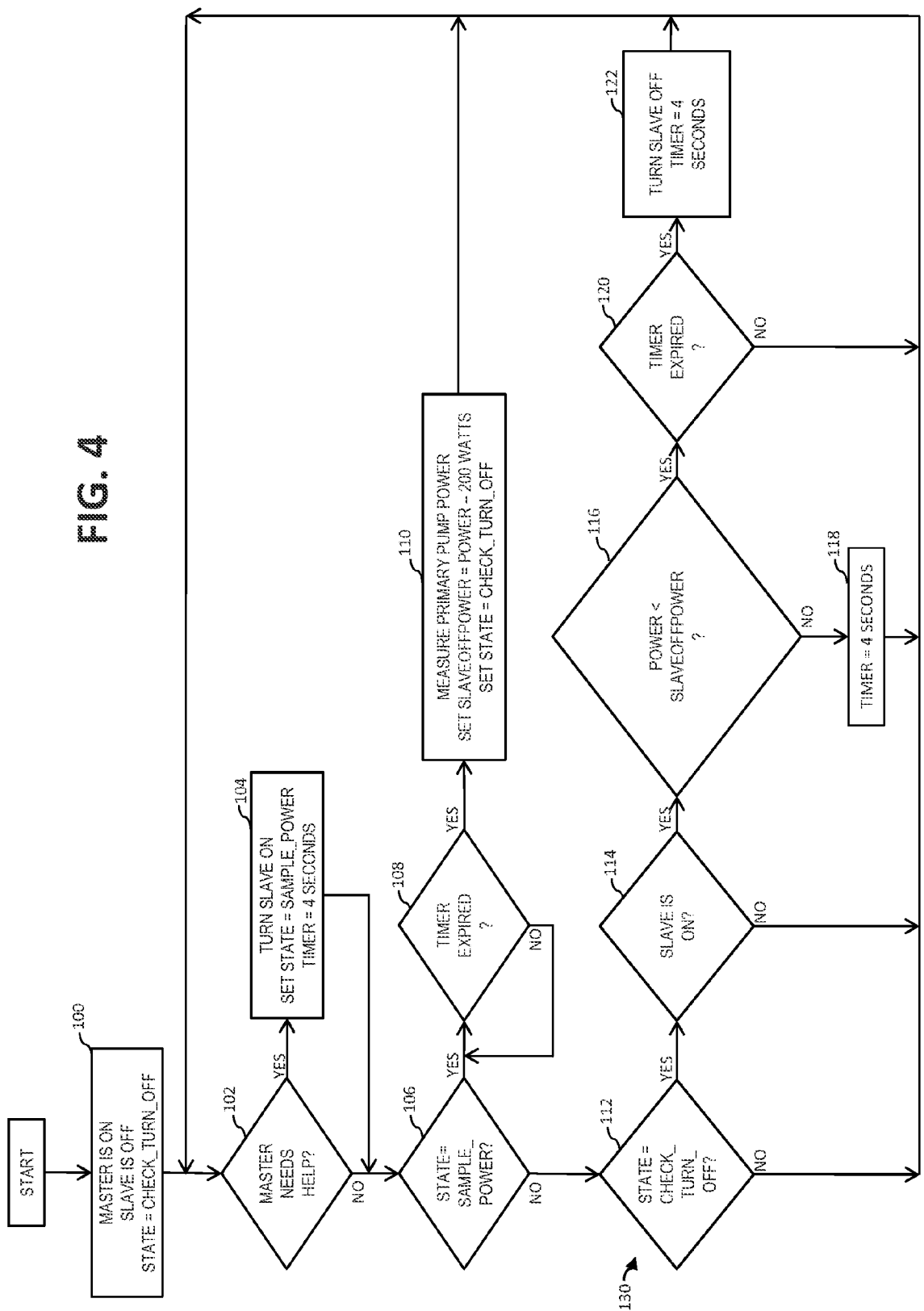
FIG. 4 is a flowchart illustrating another exemplary operation of the fuel delivery system of FIG. 1.

Another exemplary operation of fuel delivery system 10 is illustrated in FIG. 4 for controlling primary pump 12 and secondary pump 14. The operation of FIG. 4 is described herein with reference to fuel delivery system 10 of FIG. 1. At block 100, primary controller 16 turns on primary pump 12 when a single dispenser 36 is initiated for fueling, while pump 14 remains turned off. As described herein, actuation of a switch at dispenser 36 causes activation of primary pump 12. A status flag or state is set in memory 42 of primary controller 16 to direct the control sequence implemented by primary controller 16. The status flag is illustratively set to CHECK_TURN_OFF at block 100. At block 102, primary controller 16 monitors the power 50 supplied to primary pump 12 to determine if primary pump 12 requires help from secondary pump 14 to meet flow demand, as described above. If the power 50 supplied to pump 12 increases to a specified threshold level at block 102 due to additional dispensers 36 being active, primary controller 16 communicates to secondary controller 18 to turn on its associated secondary pump 14, as represented at block 104. The threshold power level of primary pump 12 for turning on secondary pump 14 is based on the type of controller 16, 18, the power rating of pumps 12, 14, and/or the power source provided to controller 16, 18. For example, a high horsepower pump 12 that draws power from a three-phase power source has a higher threshold power level than a lower horsepower pump 12 drawing single-phase power. At block 104, a timer of primary controller 16 is set to a specified time delay, illustratively four seconds, and the status flag of primary controller 16 is set to SAMPLE_POWER to direct the control sequence of primary controller 16. In the illustrated embodiment, the time delay allows secondary pump 14 to activate before primary controller 16 implements additional processing steps.

If secondary pump 14 is turned on at block 104 and the time delay set at block 104 has expired, primary controller 16 proceeds to calculate a second threshold power level of primary pump 12 at which secondary pump 14 is to be deactivated, as represented at blocks 106, 108, and 110. In particular, if the status flag is equal to SAMPLE_POWER at block 106, controller 16 determines whether the timer set at block 104 has expired, as represented at block 108. If the timer has not expired, controller 16 waits for the expiration of the timer at block 108.

If the timer has expired at block 108, controller 16 samples the power supplied to primary pump 12 after secondary pump 14 has been powered on, as illustrated at block 110. In the illustrated embodiment, the second threshold power level, illustratively "SLAVEOFFPOWER," is set to the difference between the current measured power 50 supplied to pump 12 and a fixed offset, illustratively 200 Watts, at block 110. Other suitable threshold power levels of primary pump 12 may be set for deactivating secondary pump 14. In addition, the status flag of primary controller 16 is set to CHECK_TURN_OFF at block 110 to direct the flow of processing. In particular, setting the status flag to CHECK_TURN_OFF directs processor 40 of primary controller 16 to enter a routine 130 configured to deactivate secondary pump 14 under certain conditions, as described herein.

When the status flag is not equal to SAMPLE_POWER at block 106, controller 16 proceeds to block 112. At block 112, if the status flag is not set to CHECK_TURN_OFF, controller 16 returns to block 102 to monitor the power 50 of primary pump 12. If the status flag is set to CHECK_TURN_OFF at block 112, primary controller 16 enters routine 130 and checks if secondary pump 14 is currently activated at block 114. If secondary pump 14 is not activated, the program returns to block 102. If secondary pump 14 is turned on at block 114, controller 16 determines whether the power 50 supplied to primary pump 12 has dropped below the second threshold level (SLAVEOFFPOWER) at block 116. If no, controller 16 sets the timer of processor 40 to a time delay, illustratively four seconds, at block 118 before looping back to block 102.

If the power 50 supplied to primary pump 12 has dropped below the second threshold level (SLAVEOFFPOWER) at block 116, controller 16 checks whether the time delay set at block 118 has expired at block 120. If the time delay has expired at block 120, controller 16 provides a signal instructing secondary controller 18 to turn off secondary pump 14, as represented at block 122. In addition, the timer of processor 40 of controller 16 is again set to a time delay, illustratively four seconds, to allow secondary pump 14 to shut down before performing additional processing steps. If the time delay set at block 118 has not expired at block 120, the controller 16 returns to block 102 to loop through routine 130 again. As such, in the illustrated embodiment, the power 50 supplied to primary pump 12 must be less than the second threshold level (SLAVEOFFPOWER) for the duration of the time delay (e.g. four seconds) set at block 118 before secondary pump 14 is shut down at block 122.

In one embodiment, the methods of FIGS. 3 and 4 are applied to multiple secondary pumps 14 and secondary controllers 18. In particular, the power supplied to each pump 12, 14 is monitored to determine when additional secondary pumps 14 are needed to meet the flow demand. Alternatively, the power supplied only to primary pump 12 is monitored to determine when additional secondary pumps 14 are required. In one embodiment, each secondary pump 14 and/or secondary controller 18 is assigned an address, and additional secondary pumps 14 are turned on in order of increasing address sequence. A dip switch, for example, may be used to set the address. After activating multiple secondary pumps 14, each secondary pump 14 is deactivated sequentially as the flow demand decreases and the power supplied to pumps 12, 14 is reduced. In one embodiment, secondary pumps 14 are deactivated in the reverse order that they were turned on, i.e., in order of decreasing address sequence.

In one illustrated embodiment of the present disclosure, energy use of fuel delivery system 10 is reduced or minimized by powering down the one or more secondary controllers 18 during periods of inactivity. In particular, when secondary pumps 14 are not required to meet fuel demand, secondary controllers 18 are also powered down so that secondary controllers 18 do not consume electricity during idle times. When primary controller 16 determines that additional pumping capacity is required to supplement the fluid pressure and flow, controller 16 first initiates the power up of the needed secondary controller(s) 18 and then subsequently requests that the secondary controller(s) 18 activate their associated pump(s) 14. For example, primary controller 16 may initiate activation of secondary controller 18 at block 76 of FIG. 3 and block 104 of FIG. 4.

Figure 2:
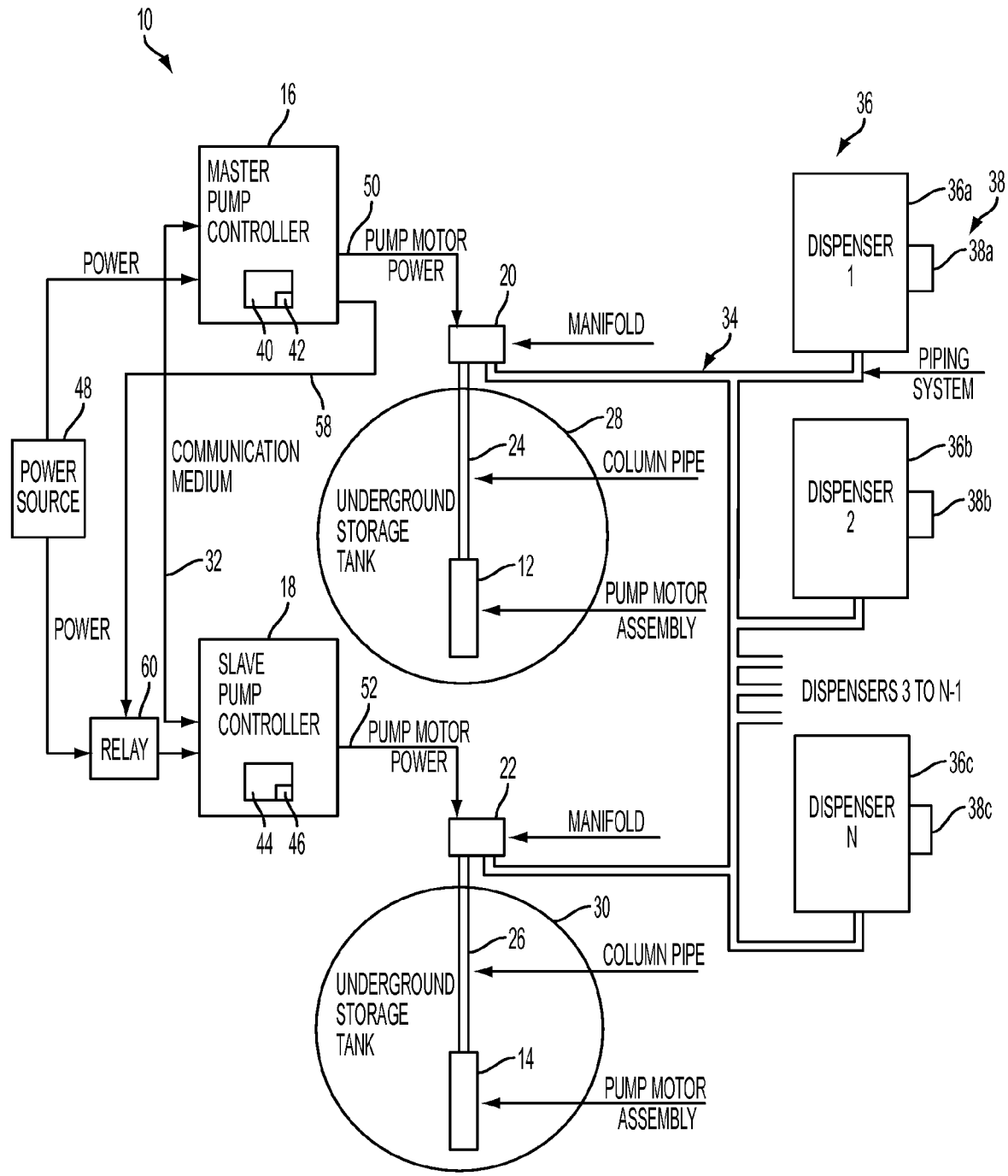
FIG. 2 is a block diagram illustrating the fuel delivery system of FIG. 1 including a relay for enabling the secondary pump controller.

For example, referring to FIG. 2, primary controller 16 provides a signal 58 to activate a relay 60 that provides power to secondary controller 18. When primary controller 16 determines that additional flow to dispensers 36 is required, as described herein, primary controller 16 closes relay 60 to apply power to secondary controller 18. After a time delay to allow secondary controller 18 to power up, primary controller 16 provides a signal to secondary controller 18 requesting activation of secondary pump 14. Secondary controller 18 then activates secondary pump 14 to assist with meeting flow demand. Alternatively, secondary controller 18 may automatically activate secondary pump 14 upon power up. When primary controller 16 determines that secondary pump 14 is no longer needed to meet flow demand (i.e., the power 50 drawn by pump 12 drops below a specified threshold level), secondary pump 14 is turned off as described above. In addition, primary controller 16 turns off secondary controller 18 by opening relay 60 of FIG. 2. In other words, power is cut to the entire secondary controller 18, and not just to secondary pump 14 as discussed above, when secondary pump 14 is not needed to supplement the pressure and flow demanded by dispensers 36.

Figure 5:
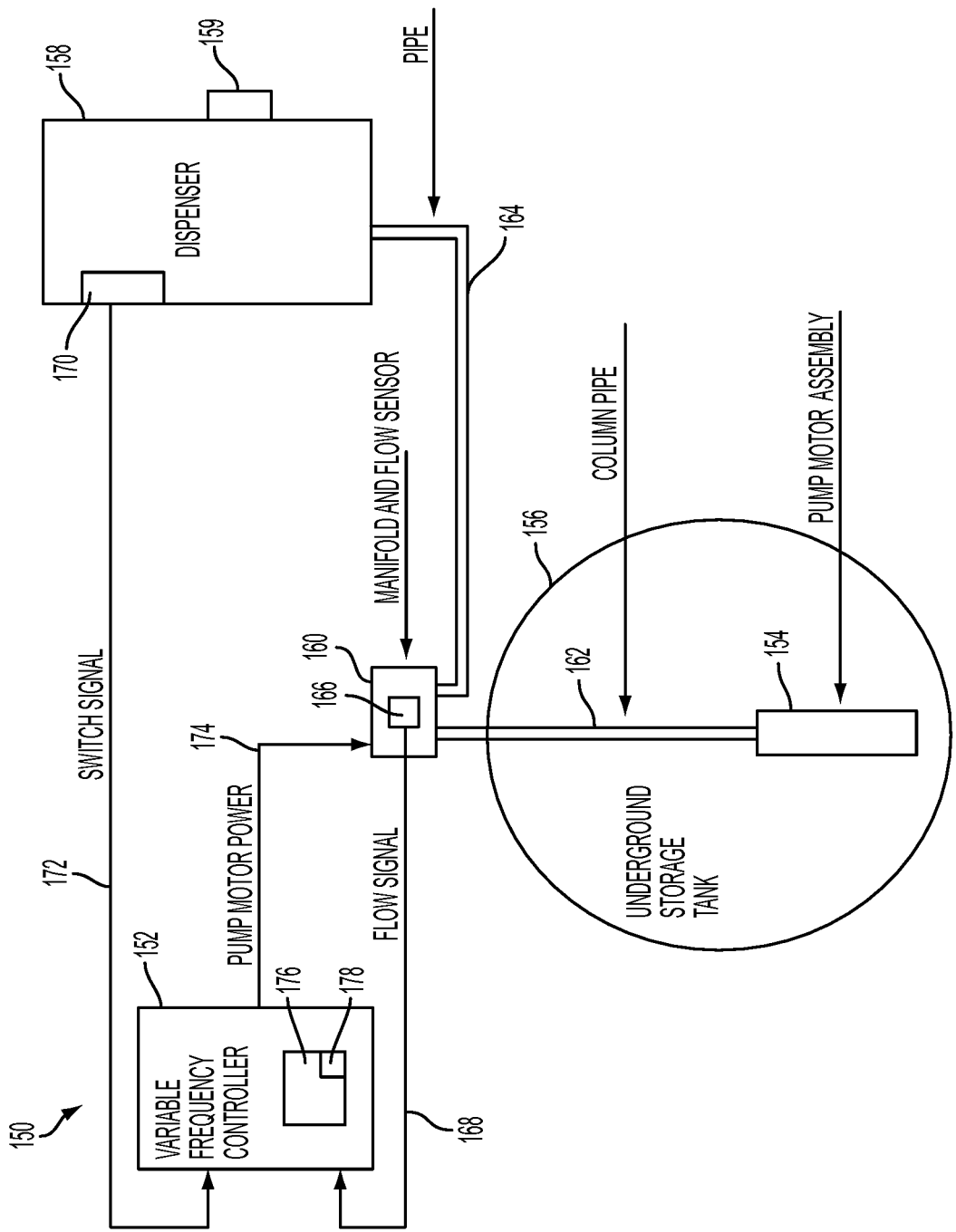
FIG. 5 is a block diagram illustrating another exemplary fuel delivery system including a variable frequency pump controller.

Referring to FIG. 5, a fuel delivery system 150 is illustrated that is configured to reduce energy use by variable speed pumps in fueling applications during periods of no or minimal fuel flow. Fuel delivery system 150 includes a pump assembly 154 positioned in a storage tank 156 and configured to pump fuel to a dispenser 158. In the illustrated embodiment, pump assembly 154 is a submersible turbine pump (STP) assembly including a variable speed motor controlled by variable frequency controller (VFC) 152. VFC 152 provides variable power 174 (e.g. AC power) to pump 154. VFC 152 illustratively includes a processor 176 and a memory 178 accessible by processor 176. Fuel delivery system 150 may include additional pumps 154, controllers 152 to control the additional pumps 154, storage tanks 156, and fuel dispensers 158. Pump 154 is connected to dispenser 158 through piping 162, 164 and manifold 160. Fuel dispenser 158 includes a nozzle 159 configured to deliver the fuel provided with pump 154 into a vehicle tank or other fuel container. As such, pump 154, piping 162 and 164, manifold 160, and fuel dispenser 158 and nozzle 159 cooperate to form a fluid flow path of fuel delivery system 150.

Dispenser 158 is configured to provide a pump activation signal 172 to VFC 152 upon actuating a switch 170. In other words, VFC 152 activates pump 154 based on signal 172 provided from switch 170 at dispenser 158. In one embodiment, switch 170 is activated upon nozzle 159 being removed from dispenser 158. Similarly, upon returning nozzle 159 to dispenser 158, switch 170 is deactivated to instruct VFC 152 to turn off pump 154. Other suitable methods may be used to actuate switch 170. For example, a user may manipulate a lever or other input device provided at dispenser 158 to actuate switch 170 and to thereby activate pump 154 with VFC 152.

In one embodiment, fueling a vehicle at fuel delivery system 150 involves first removing nozzle 159 from dispenser 158 to activate switch 170 and to turn on pump 154 in storage tank 156. A trigger is actuated on nozzle 159 to cause fuel to flow from the outlet of nozzle 159 into the vehicle or container. In one embodiment, nozzle 159 includes a provision for latching on and then turning off automatically when the vehicle's fuel tank or the container is full. Upon completion of fueling, nozzle 159 is removed from the vehicle or container and returned to dispenser 158. In addition, switch 170 is deactivated, causing pump 154 to turn off. In one embodiment, switch 170 is deactivated upon returning nozzle 159 to dispenser 158 or upon a user manipulating an input device at dispenser 158.

In one embodiment, when pump 154 is energized, power is consumed by pump 154 while no fuel flows through dispenser 158. For example, dispenser 158 may have been initialized with switch 170 to trigger activation of pump 154, but nozzle 159 has not been opened or has just been closed. In one embodiment, pump 154 in storage tank 156 continues to run until switch 170 on dispenser 158 is deactivated. In particular, during the period between stopping fuel delivery and deactivating switch 170, pump 154 continues to run and to consume energy while no fuel is being displaced from storage tank 156 through nozzle 159.

In the illustrated embodiment of FIG. 5, fuel delivery system 150 is configured to reduce or to minimize energy use by reducing the frequency/speed of pump 154 during periods of no or minimal fluid flow before and after a fueling event. A measuring device, illustratively a flow sensor or detector 166, is positioned within or connected to the fluid path between the inlet of pump-motor assembly 154 and the outlet of dispenser 158 to detect fluid flow. In the illustrated embodiment of FIG. 5, flow detector 166 is positioned in manifold 160 and provides a flow signal 168 to VFC 152 instructing VFC 152 whether there is fluid flow between storage tank 156 and dispenser 158. In one embodiment, flow detector 166 is configured to detect the position of a valve in manifold 160 to detect fluid flow. See, for example, flow detector 166 illustrated in FIG. 7 and described herein. Flow detector 166 may alternatively include a pressure transducer or switch, a power sensor, a flow meter or switch, or other suitable sensor for detecting fluid flow. Further, flow detector 166 may be positioned at other suitable locations along the fluid path. In one embodiment, flow detector 166 is configured to measure the flow rate through the fluid path.

In the illustrated embodiment, when flow detector 166 detects no fluid flow and switch 170 is activated, VFC 152 operates pump 154 at a reduced frequency or speed to minimize energy use. As such, pump 154 operates at reduced power 174 and provides a reduced pumping force when switch 170 has been activated but fuel is not being delivered through nozzle 159. In addition, pump 154 is "soft" started at a reduced speed upon activation of switch 170 to reduce the likelihood of a spike in power consumption at the startup of pump 154. In one embodiment, VFC 152 also operates pump 154 at a reduced frequency when minimal or limited fluid flow is detected with flow detector 166.

When fluid flow is detected with flow detector 166, flow detector 166 sends a flow signal 168 to VFC 152 indicating the detection of fluid flow. In response to flow signal 168, VFC 152 increases the frequency/speed and/or power of pump 154 to meet flow demand. In one embodiment, VFC 152 operates pump 154 at a substantially constant speed and power upon detection of fluid flow with flow detector 166 and activation of switch 170. In another embodiment, a greater flow rate detected with flow detector 166 results in VFC 152 operating pump 154 at a faster speed and/or greater power. For example, VFC 152 operates pump 154 at a speed that is proportional to the flow rate detected with flow detector 166. In this embodiment, VFC 152 controls the speed of pump 154 further based on the number of nozzles 159 that are open or active.

In one embodiment, fuel delivery system 150 includes one or more secondary controllers and one or more secondary pumps controlled by the secondary controllers configured to assist the primary pump 154 with meeting flow demand. Fuel delivery system 150 is configured to disconnect power to the secondary controller(s) and secondary pump(s) when the flow demand is met by the primary pump 154, as illustrated in the flowcharts of FIGS. 3 and 4 and described herein.

Figure 6:
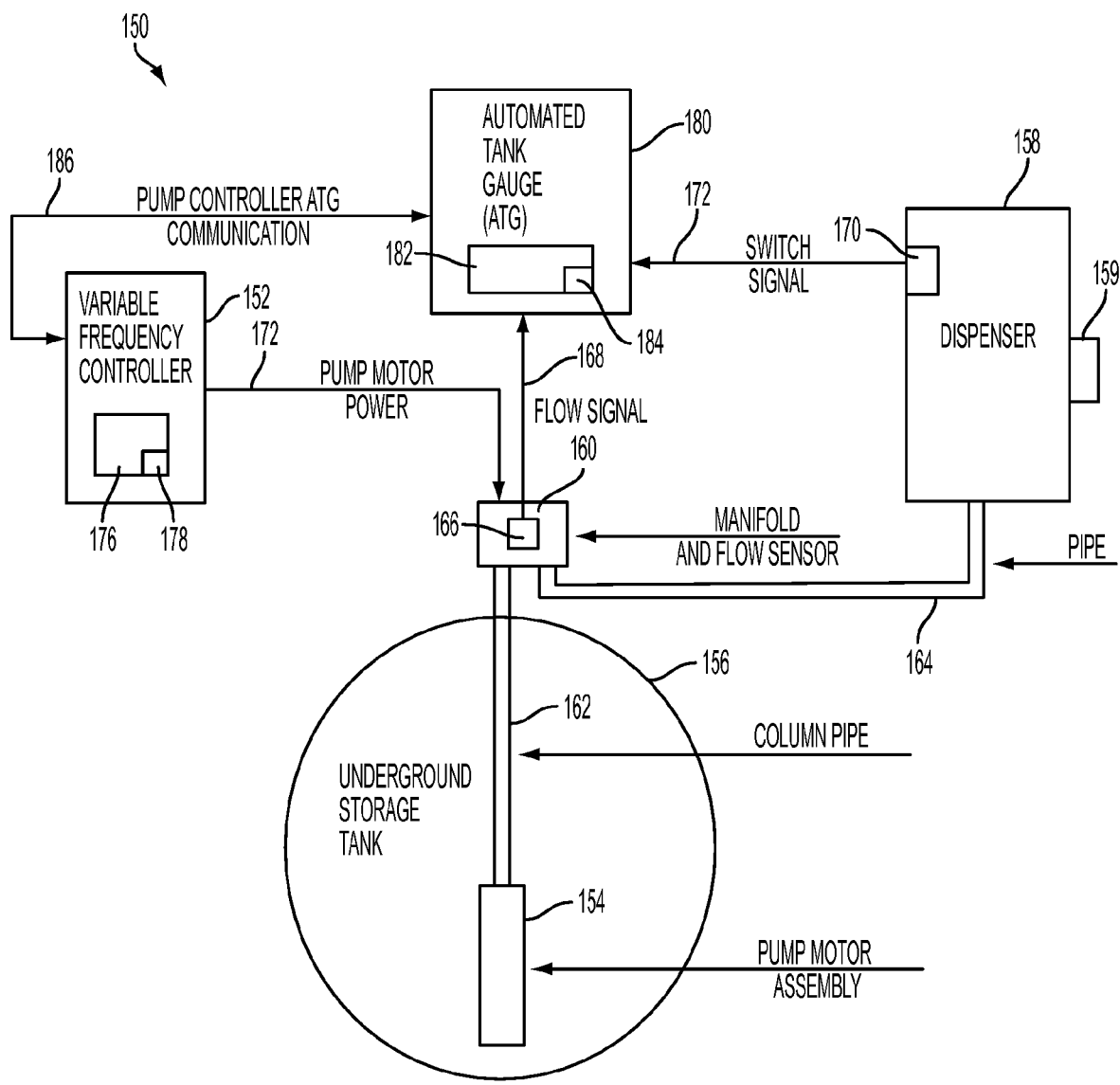
FIG. 6 is a block diagram illustrating the fuel delivery system of FIG. 5 including an automatic tank gauge.

In another embodiment, fuel delivery system 150 includes an Automatic Tank Gauge (ATG) system 180 configured to monitor the fluid level in storage tank 156, as illustrated in FIG. 6. In one embodiment, ATG system 180 illustratively includes a probe positioned in storage tank 156 for measuring the fluid level and/or temperature within storage tank 156. ATG system 180 also includes a controller or processor 182 for processing monitored fuel system data and a memory 184 accessible by processor 182 for storing fuel system data. In the illustrated embodiment of FIG. 6, ATG system 180 receives the pump activation signal 172 from switch 170 and the fluid flow signal 168 from flow detector 166 and communicates the state of these signals 172, 168 to VFC 152 through a communication medium 186. Communication medium may be wired or wireless. In one embodiment, ATG system 180 processes signals 172, 168 and instructs VFC 152 when to turn on and off pump 154 and to reduce the speed of pump 154 based on signals 172, 168.

Figure 7:
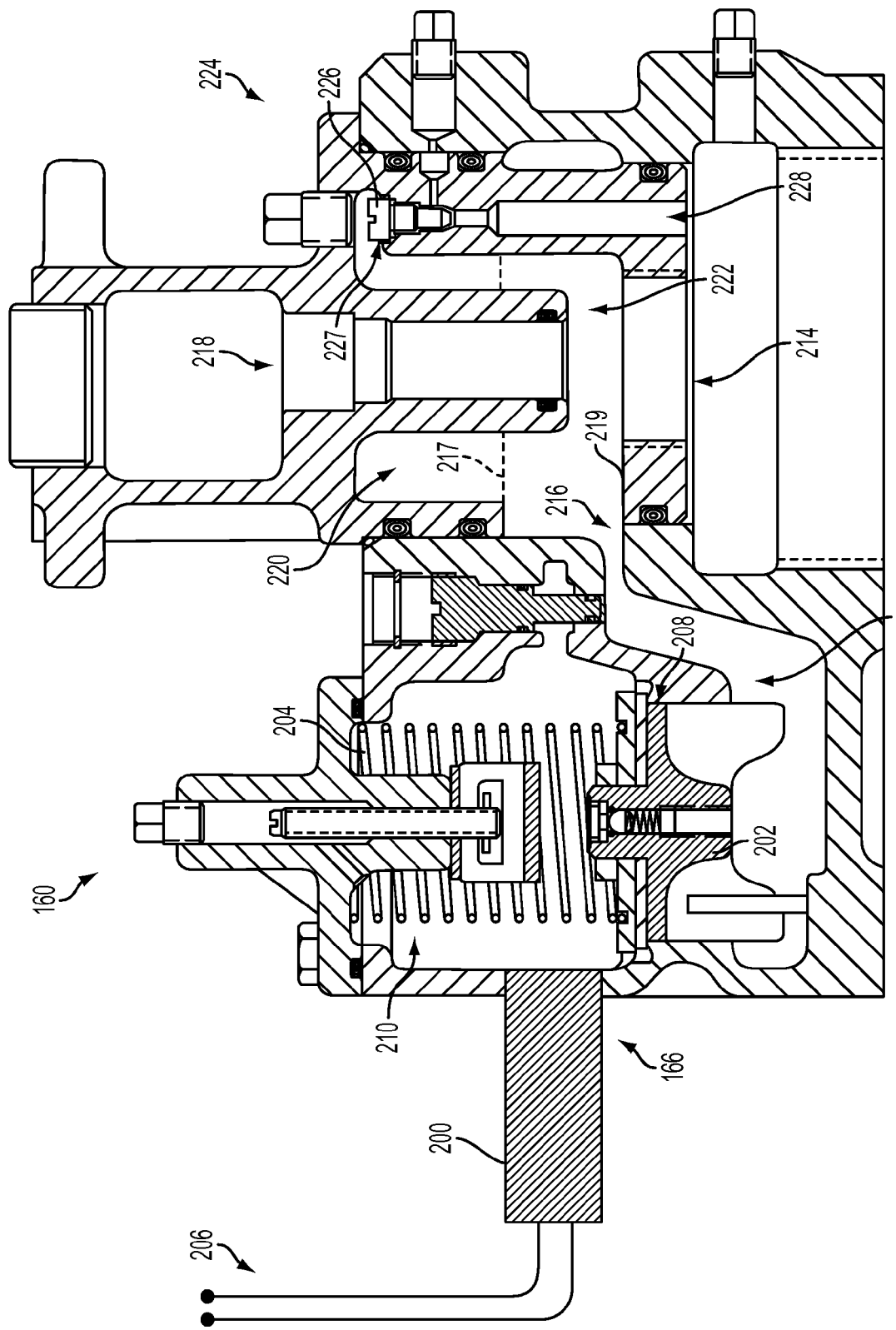
FIG. 7 is a cross-sectional view of a pump manifold including a flow detection device.

Referring to FIG. 7, an exemplary manifold 160 of FIGS. 5 and 6 is illustrated including an exemplary flow detector 166. Fluid from pump 154 enters manifold 160 through inlet 214. Fluid then flows into annular cavity 222, flows through channel 216 into cavity 212, and exits manifold 160 through an outlet (not shown) of cavity 210. In the illustrated embodiment, channel 216 extends between reference line 217 and surface 219 of manifold 160. Pump manifold 160 further includes a cavity 218 configured to receive insulated electrical wires 223 (see FIG. 8). Electrical wires 223 include communication wires routed from pump controller 152 to pump 154 for communication therebetween. Manifold 160 of FIG. 7 is also an exemplary embodiment of manifolds 20, 22 of FIGS. 1 and 2.

Flow detector 166 of manifold 160 includes a check valve 202 illustratively biased against a seat 208 by a spring member 204. When fluid moves from cavity 212 to cavity 210, check valve 202 moves away from its resting position adjacent seat 208 and compresses spring member 204, thereby allowing fluid to flow past valve 202 into cavity 210. A switch or sensor 200 is used to monitor the location of check valve 202 and to notify VFC 152 of FIG. 5 (or ATG system 180 of FIG. 6) when valve 202 has moved to indicate that fluid flow has started. For example, sensor 200 is configured to provide fluid flow signal 168 (FIGS. 5 and 6) to VFC 152 or to ATG system 180 via leads 206. Flow detector 166 may alternatively create a make/break contact detectable by an external device, such as VFC 152 or ATG system 180, to indicate fluid flow. Upon on an indication of fluid flow from sensor 200, the frequency output of VFC 152 is increased to increase flow rates through dispenser 158, as discussed above. In one embodiment, sensor 200 is a proximity sensor, although other suitable sensors may be used. Exemplary proximity sensors 200 include reed sensors, magnetic sensors, or physical contact sensors.

Pump manifold 160 illustratively includes an air purge system or bypass 224 configured to remove air received in manifold 160. In a submersible turbine pump (STP) assembly such as pump assembly 154 of FIG. 5, the possibility exists that air enters column pipe 162. Referring to FIG. 5, when pump 154 is activated to begin fluid flow, air in column pipe 162 moves along the fluid path to the nearest discharge point. If the air flows through the system piping 164 and is discharged through dispenser 158, the amount of dispensed fuel measured at dispenser 158 may not equal the amount of fuel actually dispensed at dispenser 158.

To reduce the likelihood of air discharge through dispenser nozzle 159, a collection chamber or area 220 is included within pump manifold 160 for the air to gather, as illustrated in FIG. 7. Collection area 220 illustratively includes the space above reference line 217, as channel 216 extends between line 217 and surface 219. In the illustrated embodiment, air rises in column pipe 162 when pump 154 is idle and enters collection area 220. In addition, air becomes trapped above line 217 in collection area 220 as other fluid continues to flow through channel 216 of manifold 160 when pump is active. A check valve 226 of air purge system 224 opens to allow the air and other fluid in collection area 220 to exit through passage or channel 228 during operation of pump 154. In particular, as the fluid entering manifold 160 pressurizes collection area 220, valve 226 opens (i.e., moves away from a seat 227) and the air in collection area 220 is forced back to storage tank 156 through passage 228. Check valve 226 is configured to close during idle periods of pump 154 to reduce or eliminate the communication of pressure or a vacuum through passage 228 during the idle periods.

Figure 8:
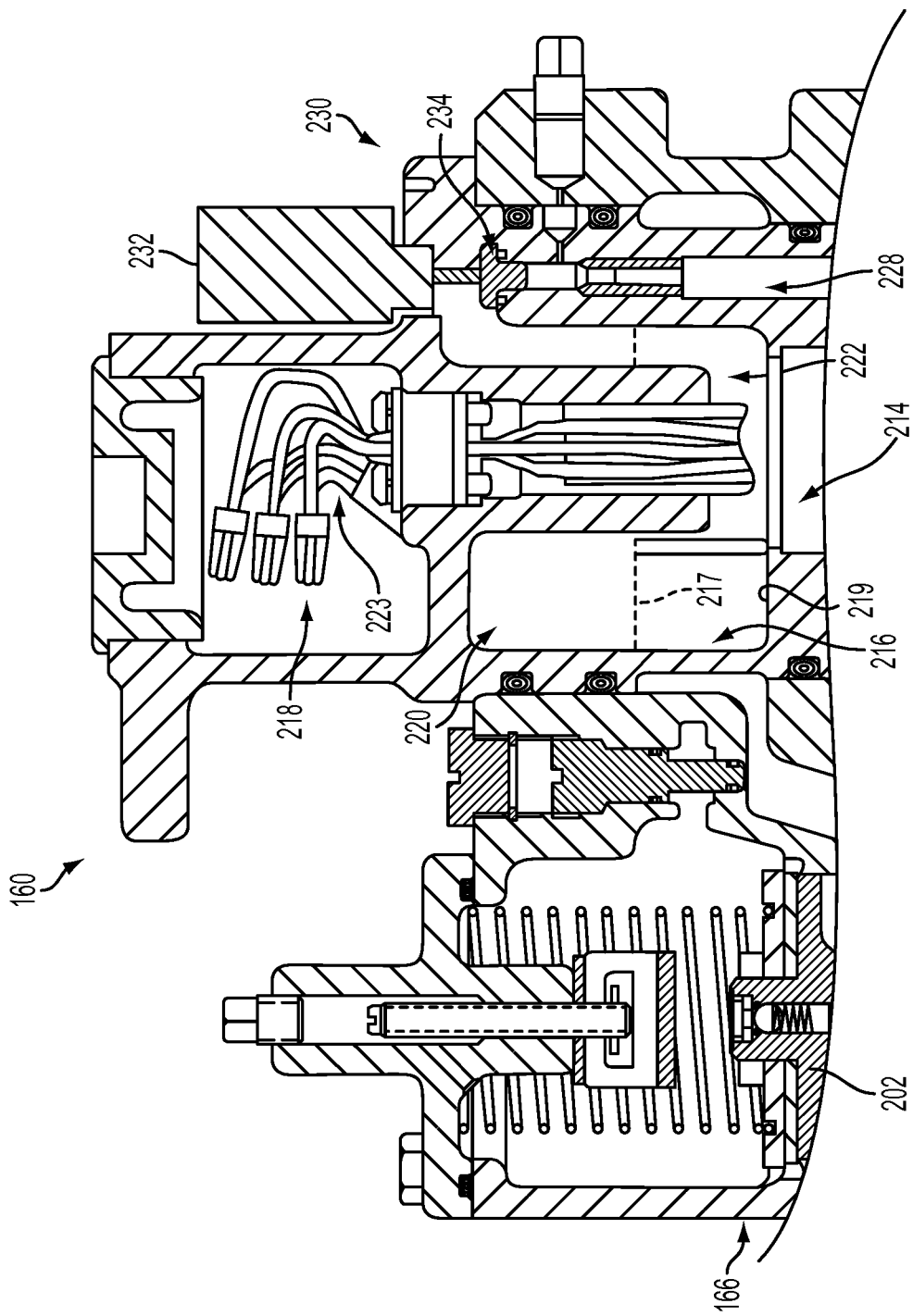
FIG. 8 is a cross-sectional view of the pump manifold of FIG. 7 including an air purging system.

In one embodiment, after the air is purged from collection area 220, valve 226 remains open. As a result, fuel continues to pass through collection area 220 and passage 228 while pump 154 is active and to discharge into tank 156. Referring to FIG. 8, another exemplary air purge system 230 of manifold 160 is illustrated that reduces the amount of fuel or other liquid flowing through passage 228 after the air in collection area 220 has been purged. Air purge system 230 includes a valve operator 232 configured to control a valve 234 to open and close passage 228. When pump 154 initiates fluid flow, the air collected in collection area 220 is pressurized. Valve operator 232 opens valve 234 to allow the pressurized air in collection area 220 to discharge through passage 228 to storage tank 156. Once the air in collection area 220 has been discharged, air purge system 230 blocks the fluid path by closing valve 234, thereby reducing or preventing fluid from returning to tank 156 through passage 228. As such, fluid (i.e., fuel) moving through manifold 160 is diverted through channel 216 and downstream to the dispensers 158.

In the illustrated embodiment, valve operator 232 is electrically coupled to and controlled by a controller, such as controller 16, 18 of FIG. 1 or VFC 152 of FIG. 5, for example. In one embodiment, operator 232 is configured to open and close valve 234 based on a set event. In one example, operator 232 opens valve 234 upon pump 154 being activated. In particular, VFC 152 of FIG. 5 provides a signal to operator 232 upon activating pump 154, and operator 232 opens valve 234 in response to the signal. In one embodiment, operator 232 opens valve 234 upon the passage of a time delay after activation of pump 154. The time delay may serve to allow the air in collection area 220 to pressurize prior to opening valve 234. Similarly, in one example, operator 232 closes valve 234 after the passage of a set time from opening the valve 234 or from activating pump 154. The set time is configured to allow substantially all of the air in collection area 220 to discharge through passage 228 before closing valve 234. In one embodiment, VFC 152 of FIG. 5 instructs operator 232 to close valve 234 after the passage of the set time.

Operator 232 may open and close valve 234 in response to other suitable inputs. For example, in one embodiment, a fluid sensor is provided to detect the presence of liquid or air in manifold 160. The fluid sensor is configured to distinguish between air and liquid in collection area 220, for example, and to provide a corresponding signal to VFC 152 of FIG. 5. VFC 152 instructs valve operator 232 to open and close valve 234 based on the signal from the fluid sensor. When fuel or other liquid is not detected by the fluid sensor in collection area 220, valve operator 232 opens valve 234 based on a signal from the fluid sensor. Similarly, upon detection of fuel or other liquid in collection area 220, valve operator 232 closes valve 234 based on a fuel detection signal provided with the fluid sensor. Exemplary fluid sensors include a fluid contact sensor, a flow sensor, and a flow switch.

In one embodiment, valve operator 232 includes an electrical solenoid configured to generate a magnetic field to open valve 234 at the startup of pump 154. Upon expiration of a timer or upon another suitable trigger, power is removed from the solenoid 232, thereby closing valve 234. In another embodiment, air purge system 230 includes a float valve 234 that is open when pump 154 is idle. When pump 154 is activated, the air collected in collection area 220 (or in another collection chamber) is discharged past the open float valve 234 and diverted to tank 156. The float valve 234 rides on the liquid entering manifold 160, and as air is displaced by the liquid (i.e., fuel), the liquid level rises and closes the float valve 234. In this embodiment, the float valve 234 is positioned within passage 228 or in another suitable location for closing passage 228 as the liquid level rises.

In another exemplary embodiment, air purge system 230 includes a sliding valve 234 that remains open in a "home" position when pump 154 is idle. In the home position, air flows freely past the sliding valve 234 and through passage 228. When pump 154 is activated, fluid entering manifold 160 begins to flow over the valve 234, and the drag from the fluid flow over the valve 234 causes the valve 234 to slide closed. Pressure from the fluid against an end surface of the valve 234 holds the valve 234 in the closed position. Once the fluid flow stops or substantially slows, the sliding valve 234 is permitted to move back to the open home position.

An air collection and discharge system may be incorporated in other areas of the fluid flow path of fuel delivery system 150 of FIGS. 5 and 6 (and fuel delivery system 10 of FIGS. 1 and 2). For example, a device separate from manifold 160 may be added to the flow path that collects air in the fuel line and routes the collected air back to storage tank 156. In another example, a collection area and air bypass system may be provided within pump assembly 154.

While this disclosure has been described as having exemplary designs and embodiments, the apparatus and methods of the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A fuel delivery system for delivering fuel from a fuel source to at least one dispenser through a piping system, the fuel delivery system comprising:
   a first pump coupled to the piping system to provide fuel from the fuel source to the at least one dispenser;
   a second pump coupled to the piping system to provide fuel from the fuel source to the at least one dispenser;
   a primary controller configured to control operation of the first pump, the primary controller monitoring a fuel demand level for fuel delivered to the at least one dispenser; and
   a secondary controller configured to control operation of the second pump, the secondary controller being activated when the fuel demand level exceeds a first threshold level, and the secondary controller being deactivated when the fuel demand level decreases below a second threshold level, wherein the primary controller supplies power to the first pump, and wherein the fuel demand level monitored by the primary controller is based on the amount of power supplied to the first pump by the primary controller.

2. The fuel delivery system of claim 1, wherein the secondary controller activates the second pump when the monitored fuel demand level exceeds the first threshold level.

3. The fuel delivery system of claim 2, wherein the secondary controller deactivates the second pump when the monitored fuel demand level decreases below the second threshold level.

4. The fuel delivery system of claim 2, wherein the secondary controller and the second pump are activated based on at least one signal provided by the primary controller when the fuel demand level monitored by the primary controller exceeds the first threshold level.

5. The fuel delivery system of claim 1, wherein the first threshold level is based on a maximum power level at which the first pump is operable.

6. The fuel delivery system of claim 1, wherein the second threshold level is based on the power supplied to the first pump after the secondary controller and the second pump are activated.

7. The fuel delivery system of claim 6, wherein the second threshold level is equal to the power supplied to the first pump after the secondary controller and the second pump are activated minus a predetermined offset.

8. The fuel delivery system of claim 1, wherein the secondary controller is coupled to a power supply by a relay, the relay being closed to supply power to activate the secondary controller in response to a signal from the primary controller when the fuel demand level monitored by the primary controller exceeds the first threshold level.

9. The fuel delivery system of claim 8, wherein the relay is opened to disconnect the secondary controller from the power supply in response to a signal from the primary controller when the fuel demand level monitored by the primary controller decreases below the second threshold level.

10. The fuel delivery system of claim 1, wherein the first threshold level is greater than the second threshold level.

11. A method of conserving energy in a fuel delivery system which delivers fuel from a fuel source to at least one dispenser through a piping system, the method comprising the steps of:
   providing a first pump coupled to the piping system to provide fuel from the fuel source to the at least one dispenser;
   providing a second pump coupled to the piping system to provide fuel from the fuel source to the at least one dispenser;
   controlling the first pump with a primary controller to deliver fuel to the at least one fuel dispenser;
   monitoring a fuel demand level for fuel delivered to the at least one dispenser;
   activating a secondary controller to control operation of the second pump when the fuel demand level exceeds a first threshold level;
   deactivating a secondary controller when the fuel demand level decreases below a second threshold level; and
   supplying power from the primary controller to the first pump, wherein the step of monitoring the fuel demand level includes monitoring the amount of power supplied to the first pump by the primary controller.

12. The method of claim 11, further comprising activating the second pump with the secondary controller when the fuel demand level exceeds a first threshold level.

13. The method of claim 12, wherein the secondary controller and the second pump are activated based on at least one signal from the primary controller.

14. The method of claim 11, further comprising deactivating the second pump when the fuel demand level decreases below the second threshold level.

15. The method of claim 11, wherein the first threshold level is based on a maximum power level at which the first pump is operable.

16. The method of claim 11, further comprising determining the second threshold level based on the power supplied to the first pump after the secondary controller and the second pump are activated.

17. The method of claim 16, wherein the second threshold level is equal to the power supplied to the first pump after the secondary controller and the second pump are activated minus a predetermined offset.

18. The method of claim 11, wherein the second threshold level is less than the threshold level.

* * * * *